United States Patent [19]

Sauer et al.

[11] Patent Number: 5,938,096
[45] Date of Patent: Aug. 17, 1999

[54] LAPTOP SUPPORT SYSTEM

[76] Inventors: Randy S. Sauer, P.O. Box 482, Harriman, N.Y. 10926; Mark E. Perri, 101 Sherman Ave., West Harrison, N.Y. 10604

[21] Appl. No.: 08/965,123

[22] Filed: Nov. 6, 1997

[51] Int. Cl.⁶ .................................. A45F 3/02; A45F 5/00
[52] U.S. Cl. ........................ 224/625; 224/270; 224/245; 224/930; 206/320; 190/109
[58] Field of Search ..................................... 224/270, 600, 224/610, 625, 626, 627, 645, 646, 647, 648, 649, 654, 655, 657, 930; D3/273, 276, 283, 287, 900; 206/701, 702, 320, 776, 777, 778, 782, 783; 108/43; 150/165

[56] References Cited

U.S. PATENT DOCUMENTS

| | | | |
|---|---|---|---|
| 1,799,877 | 4/1931 | Wheary et al. | 190/109 X |
| 3,090,330 | 5/1963 | Best | 108/43 |
| 3,541,976 | 11/1970 | Rozas | 108/43 |
| 4,715,293 | 12/1987 | Cobbs | 108/43 |
| 5,186,375 | 2/1993 | Plonk . | |
| 5,400,903 | 3/1995 | Cooley | 206/320 |
| 5,439,153 | 8/1995 | Murdoch et al. | 224/625 |
| 5,551,615 | 9/1996 | McIntosh | 224/270 |
| 5,639,004 | 6/1997 | Carlton et al. | 224/579 |
| 5,667,114 | 9/1997 | Bourque | 224/270 |
| 5,682,993 | 11/1997 | Song | 206/320 |
| 5,724,225 | 3/1998 | Hrusoff et al. | 224/270 |

FOREIGN PATENT DOCUMENTS 111551  8/1944  Sweden .................................. 224/270

*Primary Examiner*—Gregory M. Vidovich
*Attorney, Agent, or Firm*—Goldstein & Canino

[57] ABSTRACT

A laptop support system, for supporting a laptop computer upon a person, so that the laptop computer may be operated while the person is standing, comprising a lower casing and a cover. The lower casing comprises a lower casing front, two side panels, and a lower casing rear. The cover is hingeably attached to the lower casing at the lower casing rear. A waist strap is attached to the side panels near the lower casing front. A neck strap is attached to the side panels near the lower casing rear. The laptop computer has a keyboard portion and a display portion. The lower casing has a keyboard shield which protects the keyboard from moisture. A display shield is attached to the cover to protect the display from moisture. The display is situated between the display shield and the cover. When the cover of the laptop support system is opened, the display is brought into an upright position.

7 Claims, 4 Drawing Sheets

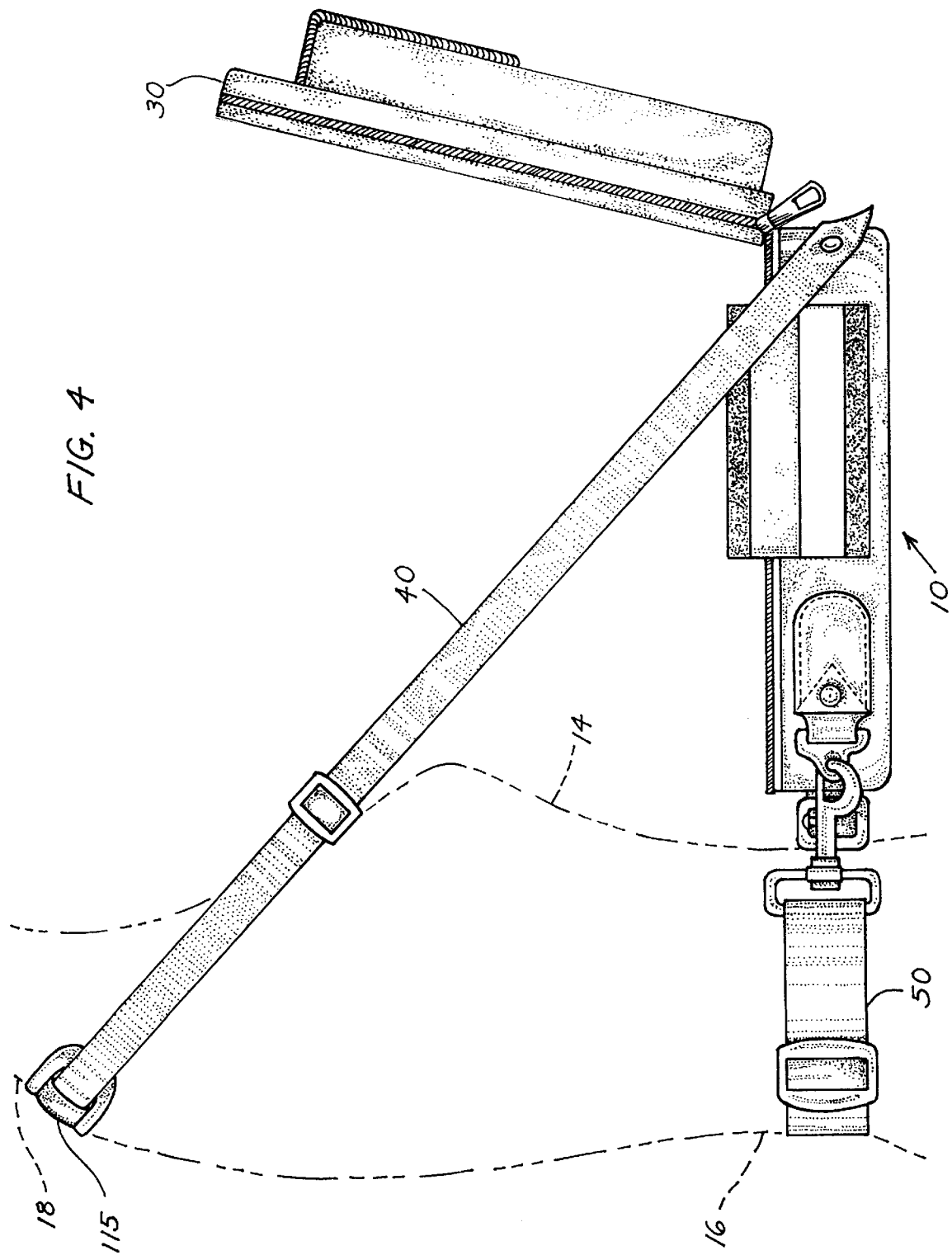

LAPTOP SUPPORT SYSTEM

BACKGROUND OF THE INVENTION

The invention relates to a laptop support system. More particularly, the invention relates to a device which supports a laptop computer and thereby allows said laptop computer to be utilized by a person while standing.

The appeal of a laptop computer is its ability to provide the functionality of a desktop computer system in a location where desktop computers are not available. Thus, airplanes, poolside, and the kitchen table are all locations where laptops are typically used. At all these locations, however, the laptop user is seated, and can place the laptop computer either in their lap, upon a table, or on some other horizontal surface.

Many occupations require that a person process a considerable amount of data while standing. Field engineers, construction personnel, surveyors, retail inventory control personnel, and even car rental personnel spend much of their time on their feet, in a location without tables, and in need of computing equipment. Many of these occupational personnel have resorted to personal data assistants, known as PDAs to provide their field computing needs.

PDAs are hand held computer systems which lack the full functionality normally provided by a laptop or desktop computer. Typically these PDAs are useful for recording data and communicating it to a host computer, but are not well suited for everyday computing needs. Often, the user will employ the PDA while in the field, and then "dock" the PDA to their desktop computer to retrieve and process the data thus received.

Thus the use of PDAs requires considerable additional expenditure, creates compatibility issues, and deprives the user of the full functionality of a desktop computer system while in the field. Most users would simply prefer to be able to use their laptop computers while in the field.

U.S. Pat. No. 5,639,004 to Carlton et al. discloses a convertible carrying case and work platform for small electronic devices. Carlton has a cover which forms a rolled portion that spaces the case a short distance away from the wearer's body when the wearer is in a standing position. Carlton also discloses a strap arrangement which crosses on the wearer's back.

U.S. Pat. No. 5,551,615 to Macintosh discloses a neck harness which has a single strap that extends around the user's neck. The neck harness includes a basket for holding a scanner, or other similar electronic device.

U.S. Pat. No. 5,186,375 to Plonk discloses a body supported holder for electronic devices. Plonk is a device which supports a small electronic device, and provides a large surface area which may be used for writing. An important feature of Plonk is that the surface area is coplanar with the front surface of the electronic device stored therein.

U.S. Pat. Nos. 3,090,330 to Best and 3,541,976 to Rozas disclose portable desks that are worn around the neck. These desks allow writing and drawing while the wearer is in a standing position.

While these units may be suitable for the particular purpose employed, or for general use, they would not be as suitable for the purposes of the present invention as disclosed hereafter.

SUMMARY OF THE INVENTION

It is an object of the invention to produce a laptop support system which allows a person to operate a laptop computer while they are standing.

It is another object of the invention to provide a laptop support system which protects the laptop computer when not in use and while being transported. The laptop support system effectively operates as a laptop case when not in use.

It is a further object of the invention to provide a laptop support system which protects the laptop against precipitation during outdoor use. The laptop support system includes one or more transparent shields which allow normal operation of the laptop while preventing moisture from reaching the laptop.

It is a still further object of the invention that the laptop is stably supported on a standing wearer in a comfortable position for operating the laptop. A dual strap system employs a neck strap and a waist strap. The neck strap extends from near the case rear and supports the majority of the laptop weight. The waist strap fastens tightly against the waist of the wearer, and stabilizes the laptop during use.

It is yet a further object of the invention that the laptop support system does not interfere with operation of the laptop and connectivity to peripherals. Access flaps are provided to give the user access to disk slots and trays, power connectors, and various ports present on the laptop, without removing the laptop from the laptop support system.

The invention is a laptop support system, for supporting a laptop computer upon a person, so that the laptop computer may be operated while the person is standing, comprising a lower casing and a cover. The lower casing comprises a lower casing front, two side panels, and a lower casing rear. The cover is hingeably attached to the lower casing at the lower casing rear. A waist strap is attached to the side panels near the lower casing front. A neck strap is attached to the side panels near the lower casing rear. The laptop computer has a keyboard portion and a display portion. The lower casing has a keyboard shield which protects the keyboard from moisture. A display shield is attached to the cover to protect the display from moisture. The display is situated between the display shield and the cover. When the cover of the laptop support system is opened, the display is brought into an upright position.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 4 is a side elevational view, illustrating the invention, with the person wearing the invention depicted in phantom.

DETAILED DESCRIPTION OF THE PREFERRED EMBODIMENTS

Figure 1:
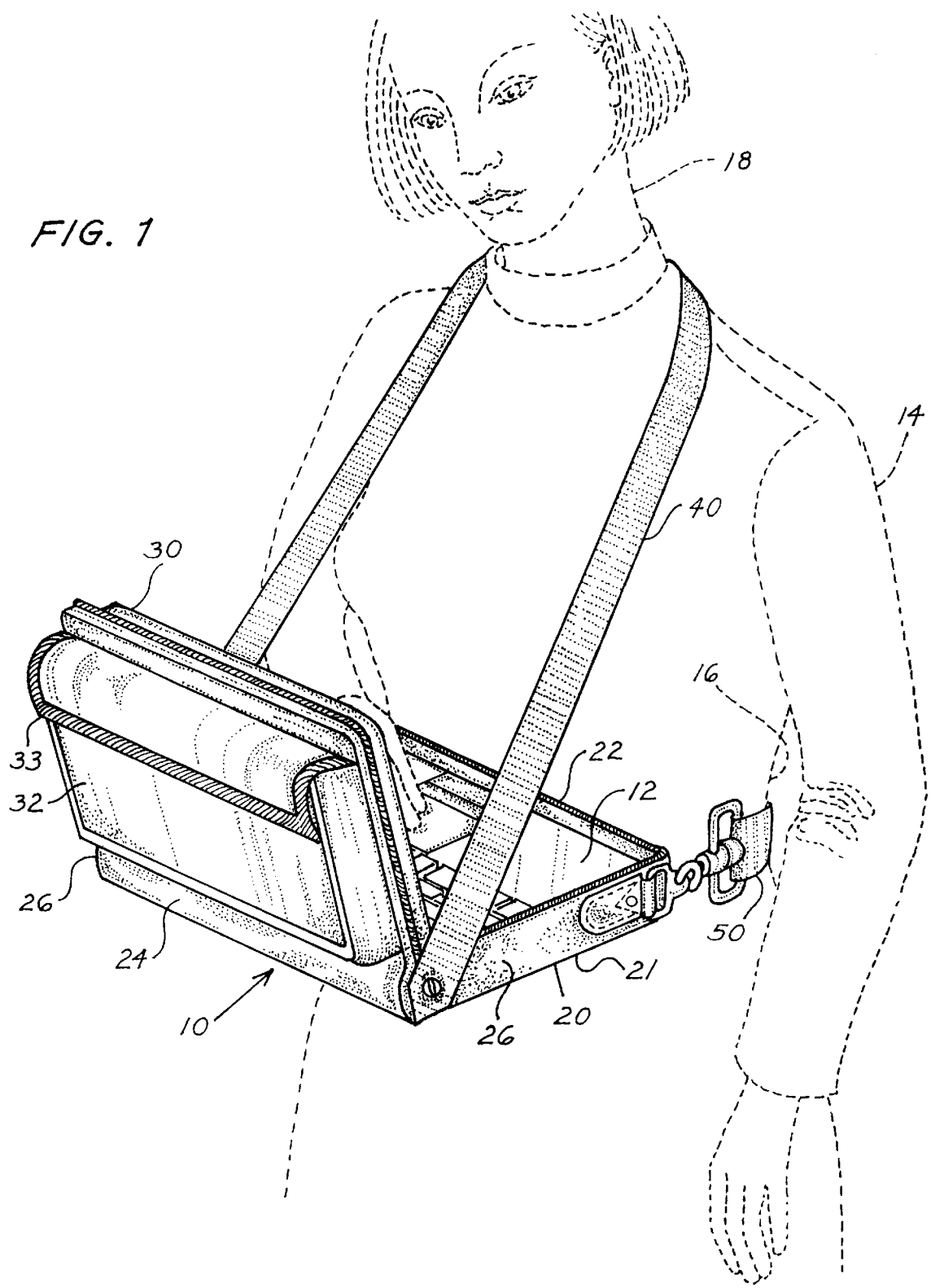
FIG. 1 is a diagrammatic perspective view, showing the laptop support system in use, being worn by a standing person.

FIG. 1 illustrates a laptop support system 10, for supporting a laptop computer system 12, by a person 14 standing upright. The person 14 has a waist 16 and a neck 18. The laptop support system 10 comprises a lower casing 20 and a cover 30. The lower casing has a base 21, and four walls extending upward from the base 21, which comprise: a lower casing front 22, a lower casing rear 24, and a pair of side panels 26. The cover 30 may also comprise a storage pocket 32 for holding accessories for the laptop computer 12, paperwork, or personal items. The storage pocket 32 has a storage pocket flap 33 that is selectively openable and sealable, for maintaining items accessory items or paperwork within the storage pocket 32 while the laptop support system 10 is being transported.

The laptop support system 10 comprises a neck strap 40 and a waist strap 50. The neck strap is attached to the lower casing 20 on the side panels 26 near the lower casing rear 24, and extends around the neck 18. The neck strap 40 supports the majority of the weight of the laptop computer 12. The waist strap 50 is attached to the lower casing on the side panels 26 near the lower casing front 22. The waist strap attaches tightly around the waist 16, to maintain the laptop computer 12 in a stable position against the person 14. The person 14 can effectively work on the computer while it is maintained in this position, as illustrated in FIG. 1.

Figure 2:
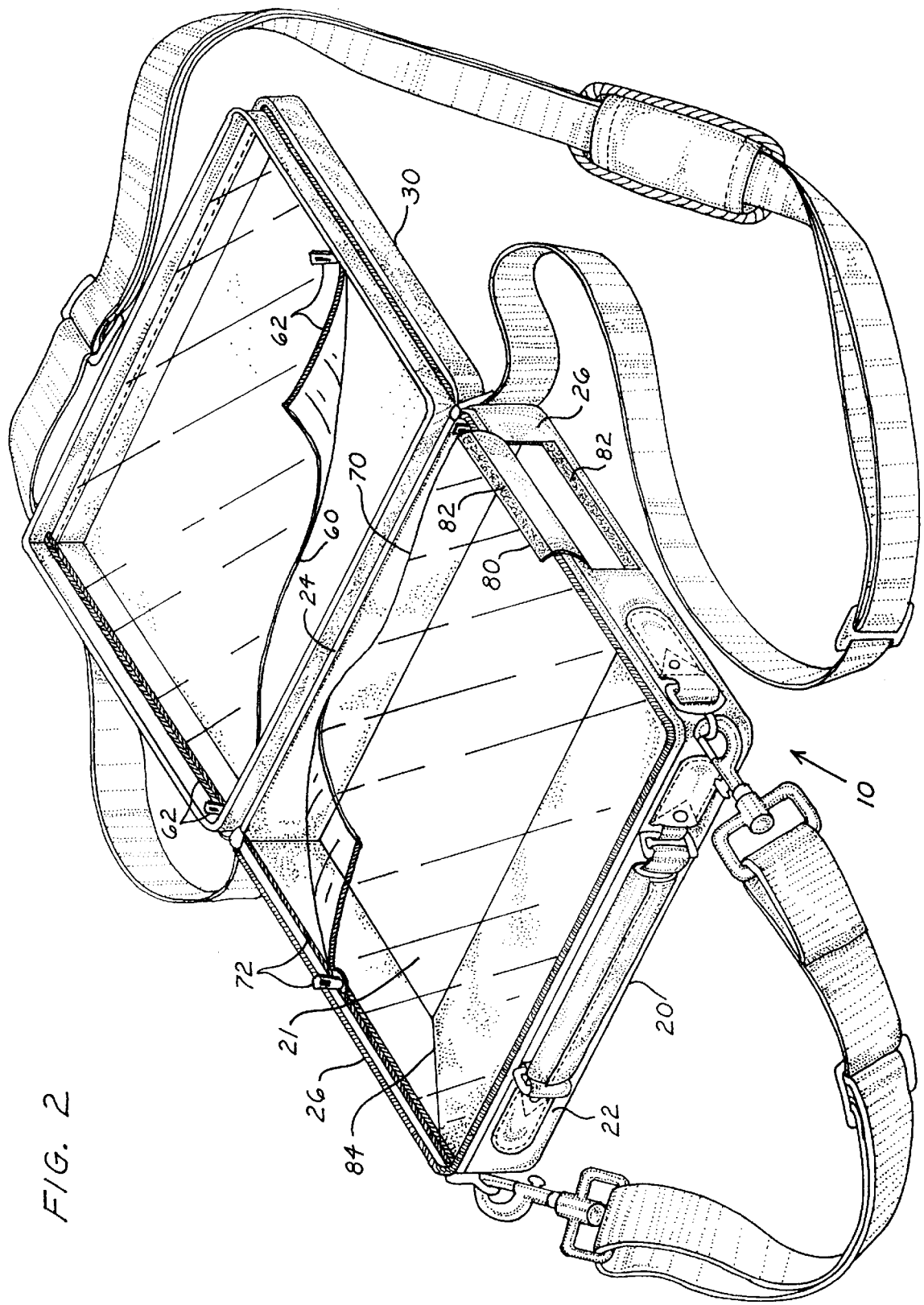
FIG. 2 is a diagrammatic perspective view, illustrating the laptop support system, with the laptop removed.

FIG. 2 illustrates the laptop support system 10 per se. Further features seen in FIG. 2 include a display shield 60 and a keyboard shield 70. The display shield 60 and keyboard shield 70 are preferably transparent mylar film, which allows proper operation of the laptop computer, but protects the same from moisture and precipitation when the laptop is used outdoor.

The display shield 60 is attached inside the cover 30, and the keyboard shield 70 is attached to the lower casing 20. The display shield 60 and keyboard shield are both open adjacent the lower casing rear 24 for allowing the laptop computer to be inserted into the cover 30 and lower casing 20 beneath the display shield 60 and keyboard shield 70, respectively.

Preferably, the display shield 60 is attached to the cover 30 with a display shield zipper device 62, which selectively secures at least two edges of the display shield 60 to the cover 30. Ideally, the display shield is open near the lower casing rear 24, and is permanently attached to the cover 30 opposite the lower casing rear 24. Thus, the zipper device 62 allows selective securement along two longitudinal edges of the cover 30. Logically, two separate display shield zippers 62 are used to secure each of the longitudinal edges of the display shield 60 to the cover 30.

Similarly, the keyboard shield 70 is attached to the lower casing 20 with a keyboard shield zipper device 72. The keyboard shield 70 should be open adjacent the lower casing rear 24, and should be permanently attached to the lower casing 20 opposite the lower casing rear 30. Thus, the zipper device allows selective securement along the side panels 26, and would typically employ two separate keyboard shield zippers 72. Each of the keyboard shield zippers 72 extends along one of the side panels 26.

The lower casing 20 also comprises access flaps 80 (only one shown for clarity) which provide convenient access to ports, drive bays, and power connectors on the laptop computer while the laptop computer is in the laptop support system 10. The access flaps may be located at the side panels 26, the lower casing rear 24, or even the lower casing front 22, to provide access as required by the particular hardware with which the support system 10 is used. The access flaps 80 are preferably selectively closable by means of hook and loop fasteners, snaps, or zippers. A hook and loop fastener 82 is illustrated herein as one possible closure system for the access flaps.

Also illustrated in FIG. 2 is an insertable bolster 84. The insertable bolster 84 is detachably mountable to the base 21 of the lower casing 20. The bolster 84 allows the keyboard to be raised slightly by the user, if desired. Because the computer is being used near the waist of the person, typing can be somewhat awkward. Thus, elevating the keyboard slightly may make keyboard use more comfortable for some users.

Figure 3:
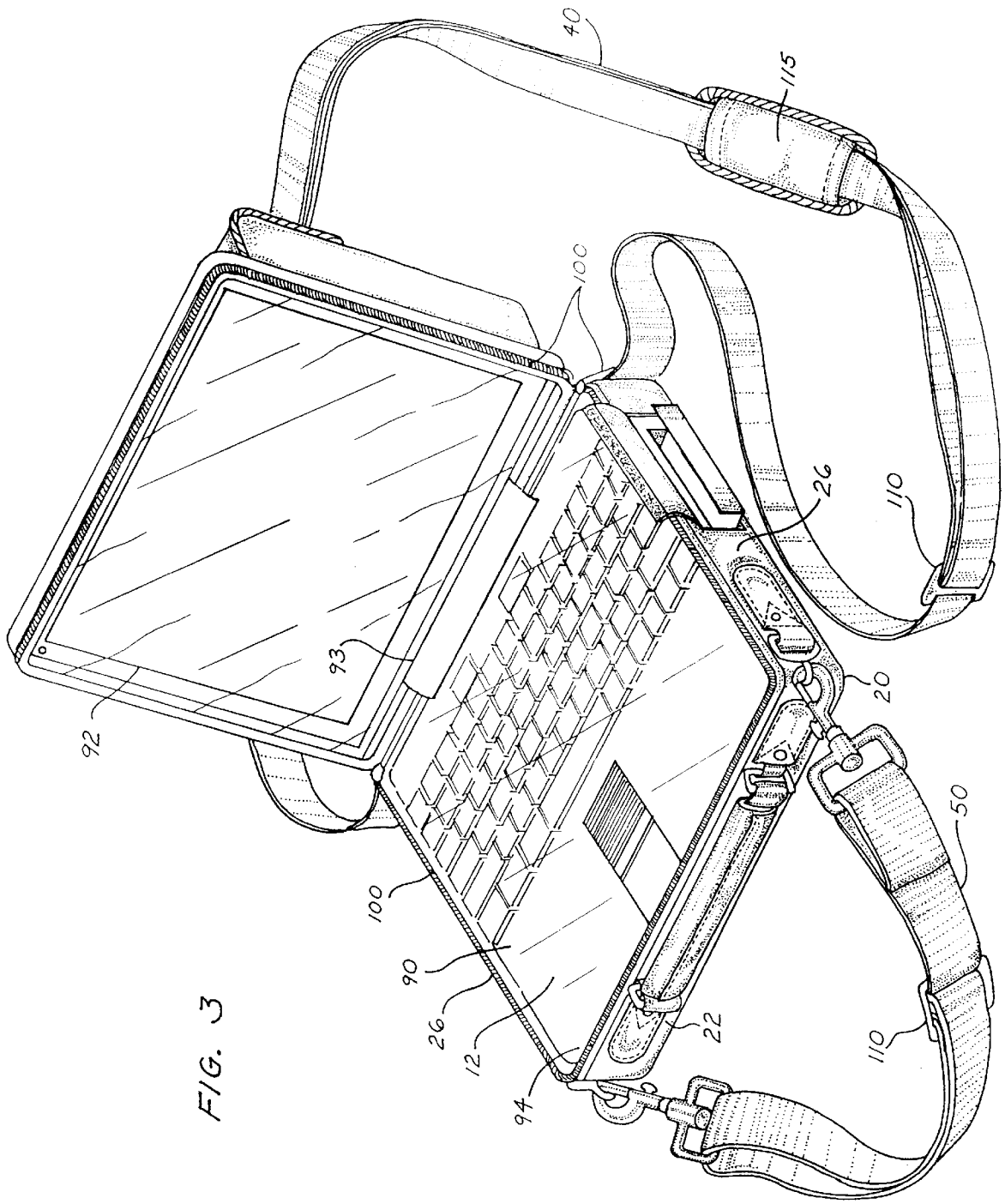
FIG. 3 is a diagrammatic perspective view, illustrating the laptop support system with a laptop computer installed therein.

FIG. 3 illustrates the laptop computer system 12 in place in the laptop support system 10. The laptop computer system 12 comprises a keyboard portion 90 and a display portion 92. The laptop computer system has a laptop front 94. A hinge mechanism 93 attaches the keyboard portion 90 and display portion 92 opposite the laptop front 94. When the laptop computer system 12 is in the laptop support system, the keyboard portion 90 is in the lower casing 20, beneath the keyboard shield, and the display portion 92 is in the cover 30 beneath the display shield. The laptop front 94 corresponds to the lower casing front 22.

The support system 10 comprises a main zipper 100. The main zipper 100 extends around the lower casing sides 26 and lower casing front 22. The main zipper 100 selectively secures the lower casing 20 to the cover 30 when the cover is closed. When the cover 40 is opened with respect to the lower casing 20, the display portion 92 is automatically brought into an upright position.

It is readily observable in FIG. 3 that the waist strap 50 and neck strap 40 each have adjustment mechanisms 110. Thus, the user may adjust the length of each strap for an optimal fit. Further, the neck strap 40 may have a neck pad 115 for distributing the weight of the laptop on a larger surface area of the neck.

Referring to FIG. 4, the support system 10 is donned by the person 14, wherein the waist strap 50 has been adjusted for a tight fit around the waist 16. Further the neck strap 40 is extending around the neck 18. The neck pad 115 is situated between the neck strap 40 and the neck 18, to prevent fatigue from prolonged used. The cover 30 is in the open position, wherein the display is held upright, and the keyboard is readily usable.

In conclusion, herein is presented a laptop support system which is capable of supporting a laptop computer system upon a person, such that the laptop computer is readily usable by the person while they stand. The laptop support system further protects the laptop computer from damage during outdoor use, and provides convenient access to the ports, drive bays, and power connection points on the laptop.

What is claimed is:

1. A laptop computer support system for supporting a laptop computer on a standing wearer, the laptop computer having a keyboard portion with a front and a rear and a display portion hingeably attached to the keyboard portion at the rear thereof, the laptop computer support system comprising:

a lower casing, the lower casing having a base with a front wall, a rear wall, a left wall, and a right wall extending upwardly therefrom, each wall having a height such that lower casing surrounds the keyboard portion when the keyboard portion is installed in the lower casing with the keyboard portion front positioned adjacent to the front wall of the lower casing;

a cover hingeably attached to the rear wall for selective movement between an open position and a closed position with respect to the lower casing, the cover comprising an inside and an outside wherein a display shield is attached to the cover inside, the display shield is transparent and is open along a junction between the lower casing and the cover such that the display portion of the laptop computer is inserted between the cover and the display shield when the keyboard portion is installed in the lower casing, wherein the display portion of the laptop computer is automatically brought into an upright position with respect to the keyboard portion when the cover is placed in the open position;

a main zipper extending on the lower casing left, right, and front walls and positioned opposite the base, the main zipper selectively securing the cover to the left, right, and front walls in the closed position;

a neck strap attached the lower casing left and right walls near the lower casing rear wall; and a waist strap attached to the lower casing left and right walls near the lower casing front wall.

2. The laptop support system as recited in claim 1, wherein the display shield is attached to the cover with a display shield zipper fastener on at least two sides.

3. The laptop support system as recited in claim 1, further comprising a keyboard shield attached to the lower casing for covering the keyboard portion, the keyboard shield is open at the lower casing rear wall for inserting the keyboard portion between the keyboard shield and the lower casing.

4. The laptop support system as recited in claim 3, wherein the keyboard shield is attached to the lower casing with a keyboard shield zipper fastener on at least two sides.

5. The laptop support system as recited in claim 4, further comprising a bolster, the bolster detachably mountable to the base for elevating the keyboard portion with respect to the base.

6. The laptop support system as recited in claim 5, wherein at least one of the lower casing walls further comprises access flaps for providing access to ports and drives on the laptop computer.

7. A method for supporting a laptop computer on a standing wearer with a support device, the laptop computer having a keyboard with a front and a rear and a display hingeably attached to the keyboard rear, the support device comprising a cover having an inside and an outside with a display shield attached to the cover inside and a lower casing having a lower casing front, a lower casing rear, and lower casing sides, the cover hingeably attached to the lower casing at the lower casing rear, the support device further having a neck strap and a waist strap, the method comprising the steps of:

placing the keyboard in the lower casing with the keyboard front corresponding to the lower casing front;

placing the display between the display shield and the cover;

attaching the neck strap around the wearer;

placing the lower casing front against the stomach of the wearer;

attaching the waist strap around the wearer; and bringing the display into an upright position with respect to the keyboard by opening the cover.

\* \* \* \* \*